(12) United States Patent
Steinich et al.

(10) Patent No.: US 7,463,021 B2
(45) Date of Patent: *Dec. 9, 2008

(54) MAGNETOSTRICTIVE SENSITIVE ELEMENT

(75) Inventors: Klaus Manfred Steinich, Zorneding (DE); Peter Wirth, Eching (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/602,680

(22) Filed: Nov. 21, 2006

(65) Prior Publication Data

US 2007/0063694 A1    Mar. 22, 2007

(51) Int. Cl.
*G01B 7/14* (2006.01)
*G01B 7/26* (2006.01)

(52) U.S. Cl. .................. 324/207.13; 324/207.24; 324/207.22; 73/290 V; 73/313; 73/314

(58) Field of Classification Search .......... 324/207.24, 324/207.13, 207.22; 73/290 V, 313–314
See application file for complete search history.

(56) References Cited

U.S. PATENT DOCUMENTS

| 5,313,160 | A | 5/1994 | Gloden et al. | |
|---|---|---|---|---|
| 5,948,255 | A | 9/1999 | Keller et al. | |
| 6,356,071 | B1 | 3/2002 | Koski et al. | |
| 6,559,636 | B1 * | 5/2003 | Brunsch et al. | 324/207.13 |
| 7,071,680 | B2 * | 7/2006 | Kurz et al. | 324/207.13 |
| 7,239,129 | B2 * | 7/2007 | Steinich | 324/207.13 |

FOREIGN PATENT DOCUMENTS

| DE | 4306951 C2 | 3/1993 |
|---|---|---|
| DE | 19917312 A1 | 4/1999 |

* cited by examiner

*Primary Examiner*—Reena Aurora
(74) *Attorney, Agent, or Firm*—Head, Johnson & Kachigian

(57) ABSTRACT

The invention relates to a sensor element and to a path sensor constructed therefrom. The optical waveguide accommodated inside a supporting body, for example, a tube has to be placed in a defined position with regard to the elements of a board. In order to obtain a design that is both simple and easy to assemble, the invention provides that the head board, without its own surrounding housing, is fixed, for instance, glued directly inside a recess of the supporting body that is tubular for the most part.

51 Claims, 5 Drawing Sheets

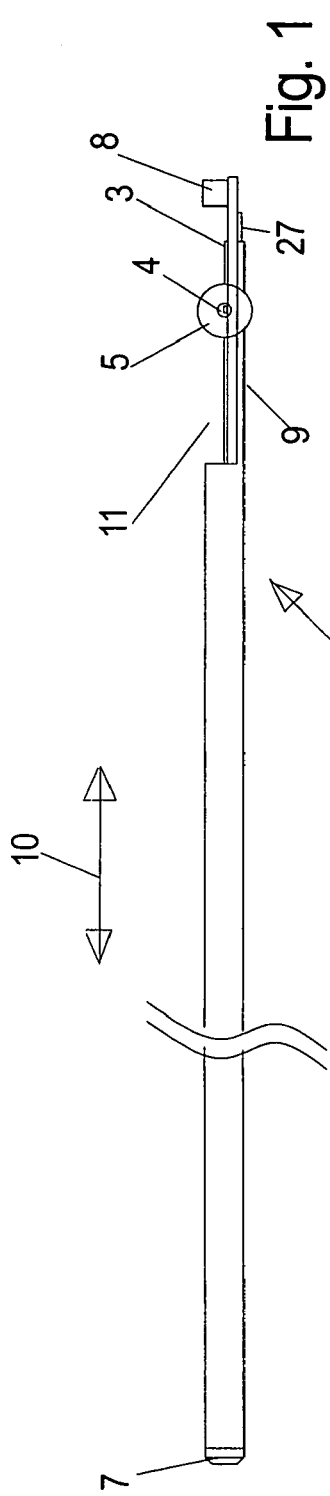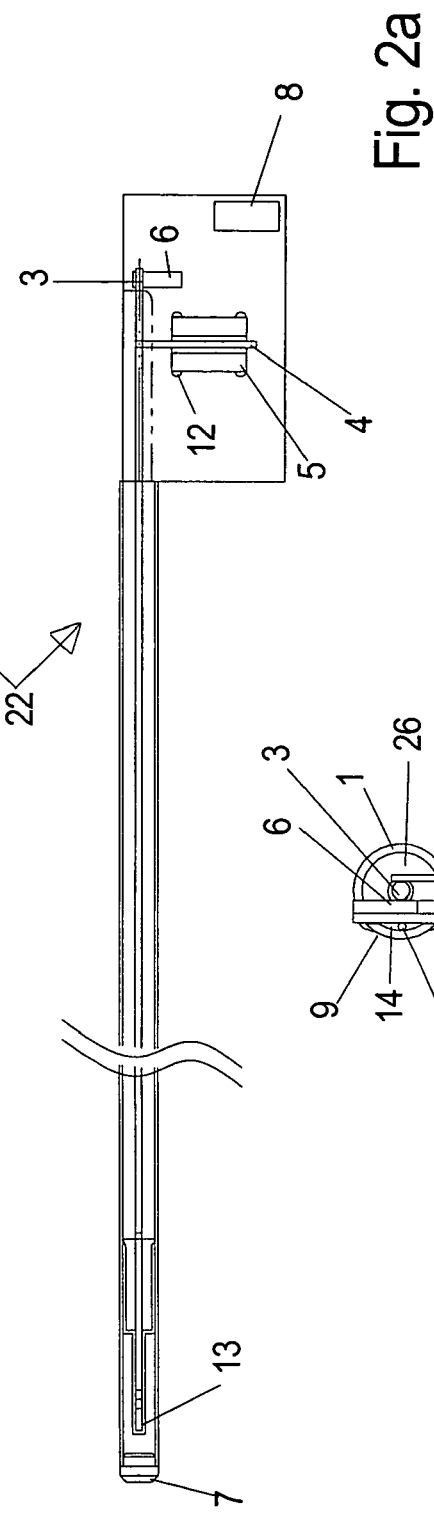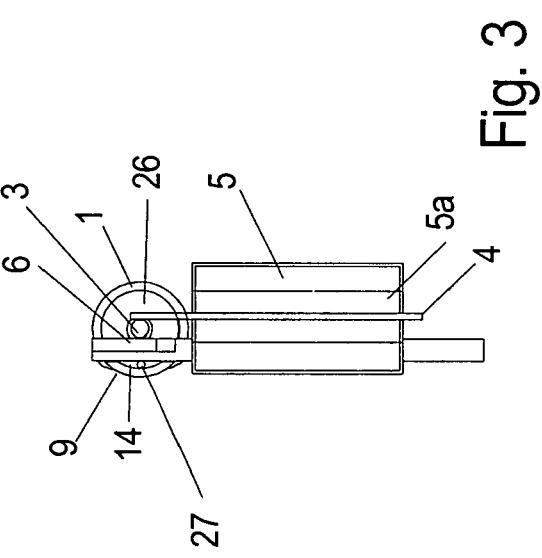

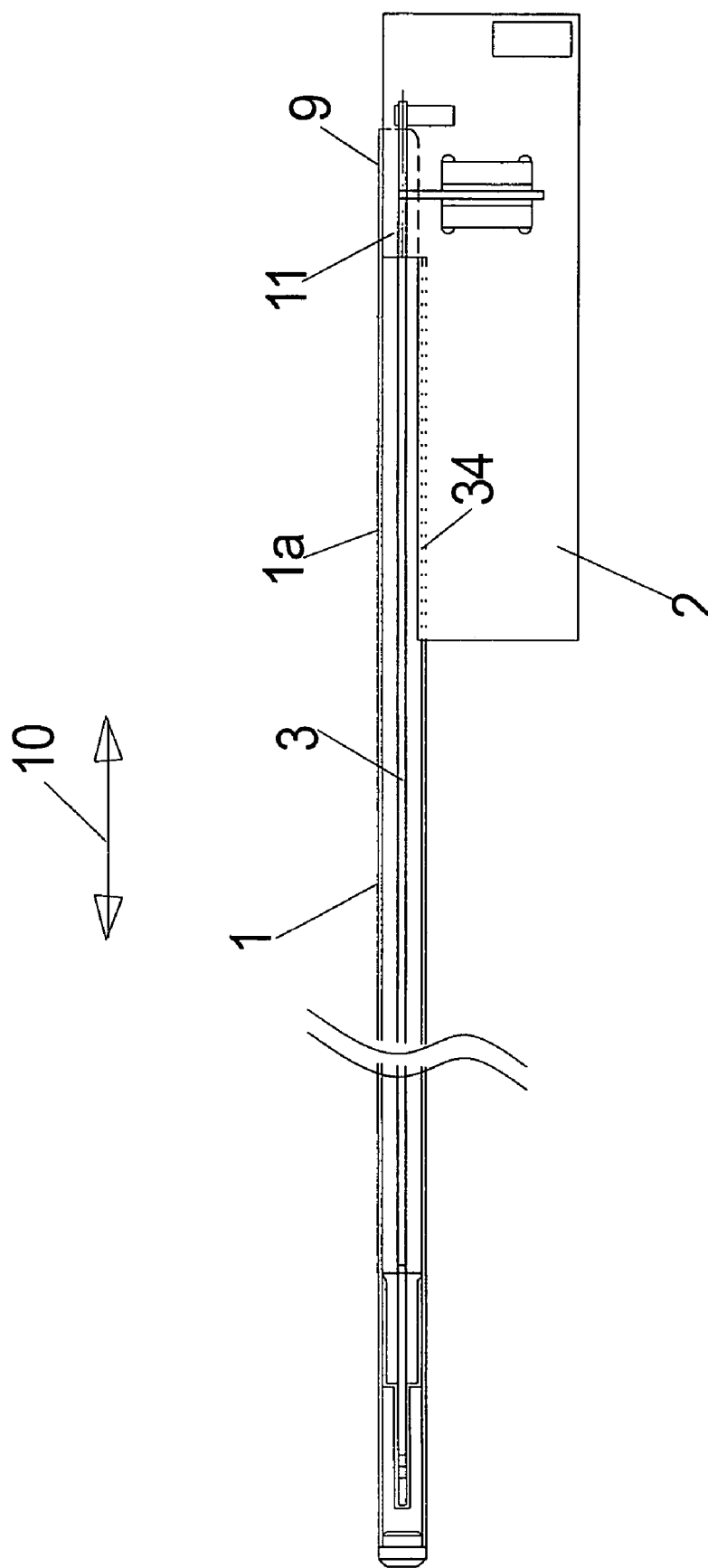

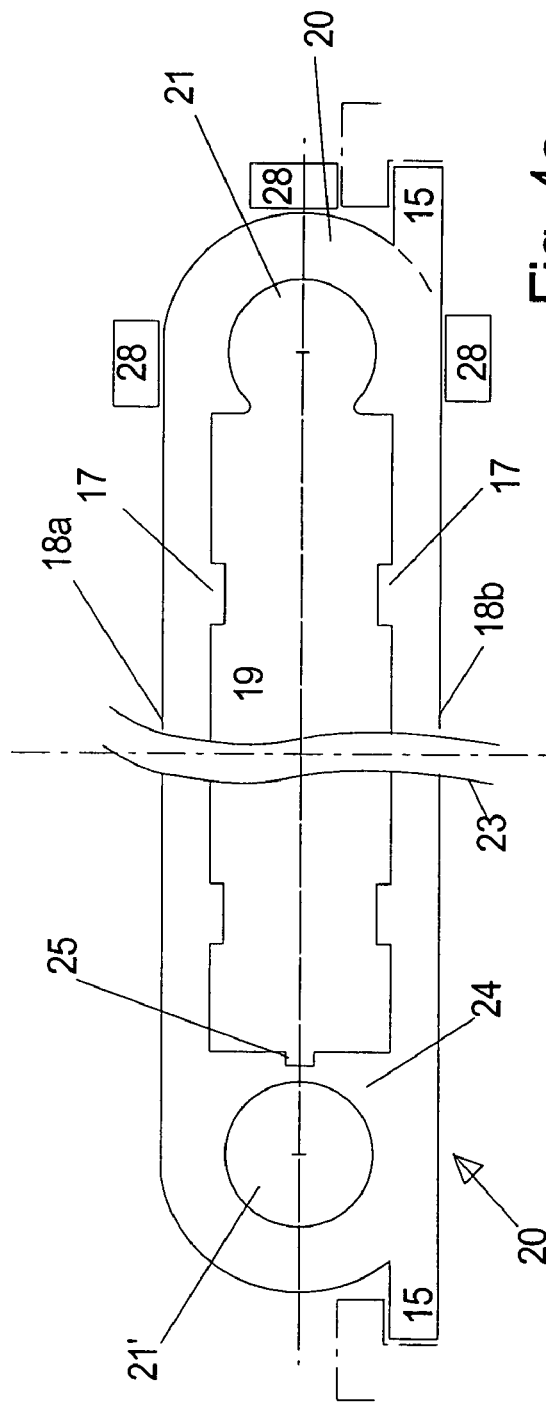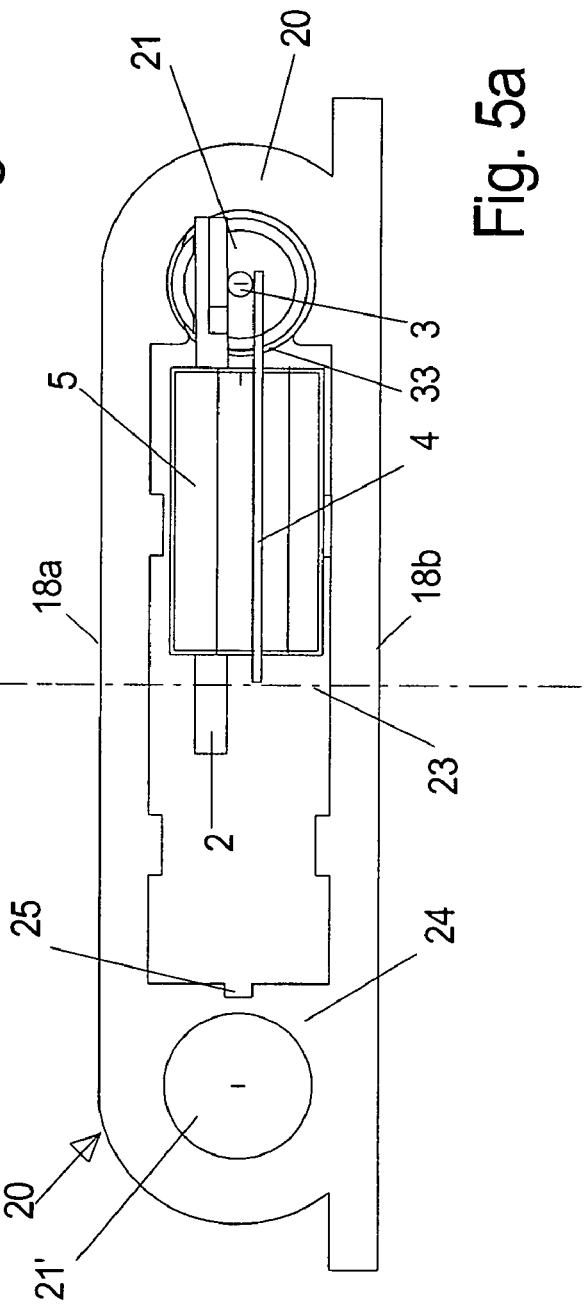

MAGNETOSTRICTIVE SENSITIVE ELEMENT

CROSS-REFERENCE TO RELATED APPLICATION

This is a United States National Phase application of PCT Application No. PCT/EP02/14811entitled "Magnetostrictive Sensitive Element" which has an International filing date of 31 Dec. 2002 and which claims priority to German Patent Application No. DE10164544.9 filed 31 Dec. 2001 and to German Patent Application No. DE10201880.4 filed 18 Jan. 2002.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATED BY REFERENCE OF MATERIAL SUBMITTED ON A COMPACT DISC

Not Applicable

BACKGROUND OF THE INVENTION

Field of Invention

The invention concerns a magnetostrictive displacement sensor.

A magnetostrictive displacement sensor comprises a magnetostrictive material made of wave-guide, as a rule filamentary or cannular, extending in the measuring direction, in particular linearly. By a position magnet, in particular brought without contact beside the wave-guide, by the magnetic fields interference there is produced a mechano-elastic wave which is spreading in those two directions along the wave-guide guide to be detected at its end. Because of the predefined propagation time there can be determined the precise distance of the position magnet in respect of the end of the wave-guide and thereby the position of a mobile constructive unit the position magnet is attached to.

As to the assemblage, from EP 0 882 212 there is for example known the inserting of the wave guide into a support body, for example a tube, and the terminal plate into a specific housing connected to the support body at one of its ends. Since firstly the passing between the support body and this terminal plate has to be conceived very stable from a mechanical point of view too, to the previous constructions this objective was accomplished in that the terminal plate housing was surrounding in the exterior the support body in its terminal area.

But this thing raised the costs and thereby the manufacturing price of the sensitive element.

Supplementary, there can be discarded too a separate coating of the terminal plate in the shape of a completely closing housing, in particular having its own stability, since this sensitive element—due to the fact that the support body has a limited stability too—will always be included into a considerably more stable protective housing, for example into a protective profile, by having the support body of the sensitive element inserted, whereupon this protective profile always changes its shape according to the employing situation and can be directly made too from parts of the constructive element whose position is to be determined.

An ideal shape of such a stable protective profile is a protective profile as flattened as possible to have it arranged on the surfaces of another constructive element without occupying a great supplementary volume.

On the assemblage costs an important role is played by the correlation among the Villary tape, the wave guide and the detection coil as well as their arrangement on or into the terminal plate respectively since the Villary tape has to be positioned with a console free overhang from the wave guide through the center of the detection coil orifice and by touching the effect can already be influenced.

SUMMARY OF THE INVENTION

Therefore the object of the present invention is to realize a magnetostrictive sensitive element and a displacement sensor comprising this element (without the position magnet), which is to be both easy and cheap to manufacture and stable enough for different employing situations. Furthermore, there must be provided a method as simple as possible to assembly both such a sensitive element and the finite displacement sensor and/or supplementary having the sensitive element conceived as a modular component element of the sensor and thereby separately employed with an output signal, in particular having a low impedance.

By having a terminal plate or circuit board directly attached to a suitable portion, in particular opened, of the support body, for example a channel bar or a tube, there is no more needed a separate stabilization housing or a joining element for the terminal plate. This thing considerable facilitates the assemblage too.

In this case the components arranged on the terminal plate will be freely accessible but since the entire sensitive element never remains open, always being inserted into another stable protective housing, in particular a protective profile, in practice this thing is not a drawback.

In case that the terminal plate has to be protected against the elements, the terminal plate can be coated, preferably after being attached to the support body, for example with a "Conformal Coating", therefore with a plastic material coating having an essentially constant covering thickness, thing as a rule accomplished by spraying or dipping into a fluid plastic material. The recess for the terminal plate is machined here in the transverse section of the support body thus that the remnent extension should properly include the terminal plate, for the extension being provided an increased own rigidity.

On a cannular support body, according to the size, the thickness of the wall and the material the tube is made of, the recess can extend over more than half of the transverse section thus that the remanent extension should represent an almost flat segment considerable smaller than 180° from the round circumference of the tube, and the terminal plate should set itself but with its lower side on this almost flat extension.

Another possibility consists in that, as far as the angular segment in its transverse section is concerned, the recess should be conceived smaller and the terminal plate should be inserted then into the more curved C shaped extension thus that into the interior circumference of the remanent extension should be included and attached to it not only the marginal area of the lower side but the contiguous narrow side of the plate too. This thing has the advantage that the stability of the extension, in particular against vibrations, increases huperproportionally with the size of its angular segment.

The cutting surfaces of the recess are extending here preferably in parallel to the longitudinal direction of the support body and that of the tube respectively, which can be either straight or curved, thus that the terminal plate attached to them should be parallel to this longitudinal direction, the measuring direction of the sensor.

The terminal plate will be joined to the extension as rigidly as possible, therefore joined by shape or by force, in particular by gluing, namely both to the cutting surfaces of the extension and to the interior circumference, arranged between them, of the extension as well as to the exterior rims of the extension.

As long as the shape of the extension's transverse section surrounds here as a C not only the lower side but the terminal plate narrow side too, this fact provides an outstandingly stable joint.

If on the terminal plate there has to be mounted the entire electronics to generate signals included within the value ranges employed in industry or automations respectively (in particular start-stop/0-10 Volts/4-20 mA/0-5 Volts/CAN-Bus/Profi-Bus/Device-Net -Bus/SSI/Endat), the terminal plate has to be greater but on mounting the components to generate the electric signal.

In this case the terminal plate will be enlarged by having it extended along the measuring direction, therefore along the support body, whereupon the terminal plate is extending in the measuring direction beside the support body, but here the longitudinal rim contiguous to the support body is not preferably joined to the exterior circumference of the support body but enters and is attached, in particular glued, into a slot of the support body arranged in the measuring direction. To a cannular support body, on one side, the slot either completely penetrates the wall of the tube or will represent but a groove in the exterior surface of the tube, or will be directly glued to the support body of the wave guide.

The terminal plate is equipped with the components mounted on it, more electric and electronic ones, if possible but on one side, namely on that opposed in respect of the extension, to the end that the entire sensitive element should protrude laterally as little as possible or not at all over the width of the support body. By the recess extending over more than half of the transverse section, this thing is provided when equipping the plate on the opposite side.

The only exception is in this case the detection coil, which will not be unilaterally arranged on the terminal plate but in order to accomplish the same purpose it is arranged into a notch or into a penetration of the terminal plate and is extending on both sides of its main plane.

Depending on the diameter of the detection coil, its arrangement in respect of the terminal plate as well as the width and/or the thickness of the extension are thus chosen that this coil is either inside the width of the support body or per total protrudes laterally as little as possible over it, therefore in particular it should not to be arranged more to the interior of one side while on the other should protrude over the exterior dimensions of the support body which in a transverse section is either opened or closed.

On the front end, opposed in respect of the terminal plate, the cannular support body having a closed contour can be tightly closed by a lid. Preferably, the cannular support body, therefore having a closed contour, is opened at least on the rear end, from the terminal plate, while the wave-guide protrudes there freely, therefore in particular without a straining spring. Thereby there is possible a cheap and simple fabrication from an almost continuous profiled material by a simple cutting off. Here the wave guide can remain more to the interior or can likewise protrude over the end of the support body. On the front end too the transverse section of the support body is usually opened. Further on the terminal plate there is a connector for connecting an electric or electronic processing unit.

Thereby the sensitive element can be inserted, preferably joined by shape and thereby propped, with the closed or opened front end of the support body into a suitable protective housing, while on the rear end, namely from the terminal plate, by means of the connector inside the protective housing there can be taken out an electric connection, for example interrupted by another connector (or cable) being again inside the protective housing, for example from the terminal lid of a suitable protective profile.

A suitable protective profile has an interior circumference with a preferably closed transverse section, in particular made in one piece, and at least one interior circumference inside which there can be inserted the support body of the element to be held there by shape in the transverse direction thus that to withstand even vibrations or shock like mechanical stresses of the sensor without distorting the measuring signal. In particular to this end, between the protective profile and the sensitive element there is a damper which may consist of a profiled body or from a damping glue too between those two constructive elements.

For a round tube as support body the interior circumference has the shape of a circular arc and is unilaterally opened for console overhang, in the remaining thus formed opening, of the unilaterally prominent terminal plate from the support body, or is circularly closed too. In this case, in order to take out the terminal plate into the main space of the protective profile, in the terminal area of the protective profile in the interior circumference there must be milled a properly dimensioned lateral hatch.

In case of an interior diameter separated with the remaining opening inside the protective profile, the stiffening wall extending between them can be conceived as thick that to still be possible the boring of some passing orifices—preferably more, uniformly spaced in the measuring direction—in this stiffening wall, which penetrate from an exterior surface towards the opposite exterior surface of the transverse section of the protective profile and have no connection either to the opening or the interior circumference of the protective profile. Through these passing orifices there can likewise take place in a simple manner a screwing of the protective profile to another constructive unit without the necessity of having extensions or prominences for employing catching pieces or the like on the exterior contour of the protective profile, and thereby there can be obtained per total a smooth continuous exterior circumference without shoulders.

But preferably the protective profile will be formed per total as an extruded profile and will be cut off to the necessary length, while supplementary in the terminal areas of the interior circumference will be widened by milling, in particular on the one hand to make room for the terminal plate which must be entirely seated inside the protective profile, and on the other hand to include terminal lids to be inserted in the front ends of the protective profile and which—thereby likewise the interior circumference of the protective profile in its terminal area—must have all around a non-passing contour with sharp rims in order to employ as packing an O-ring joint seated into a groove, which leads to a considerable decreasing of the assemblage costs by avoiding the specially formed flat packings which must be previously made.

The protective profile can be symmetrically equipped with two interior circumferences arranged into a mutually opposed relationship thus that there can be inserted two different sensitive elements into the same protective profile, from example from different front sides, while the sensor thus obtained can be thus conceived redundant.

The protective profile can be formed asymmetrically too, in particular thus that to have but an interior circumference and an opening arranged beside. Supplementary in the narrow side of the opening, extending in the measuring direction, there can be arranged at least one groove, namely on the narrow side of the opening opposed in respect of the interior circumference. Here the groove is preferably thus dimensioned and arranged, in particular eccentrically arranged, that the terminal plate of a sensitive element inserted into the interior circumference can be inserted and supported, in particular attached too, for example glued, in this groove, with its free longitudinal rim overhung in console.

A special necessity is here the forming as flattened as possible of the protective profile, whereupon one of two exterior surfaces parallel each other, in particular the longer ones, can protrude laterally with extensions for attaching to another constructive unit.

Especially when these extensions are missing while the flattened protective profile has at least at one of its narrow sides an all around smooth exterior circumference, there is thereby obtained the advantage to have a position magnet arranged very close and from all three sides, therefore on a circumference angle of more than 270 degrees, in the exterior on the narrow side of the protective profile comprising the sensitive element, which facilitates much the arrangement of such a sensor on a machine, and which can be displaced in the measuring direction over the entire length of the wave guide and over the length of the terminal plate.

BRIEF DESCRIPTION OF THE DRAWINGS

An embodiment in accordance with the invention is described in greater detail by way of example hereinafter with reference to the figures. These show:

FIG. 1: an upper view of the sensitive element,

FIG. 2*a*: a lateral view according to FIG. 1,

FIG. 2*b*: an upper view of another embodiment of the sensitive element,

FIG. 3: a front view according to FIG. 1,

FIG. 5*a*: the displacement sensor in a front view,

Figure 4B:
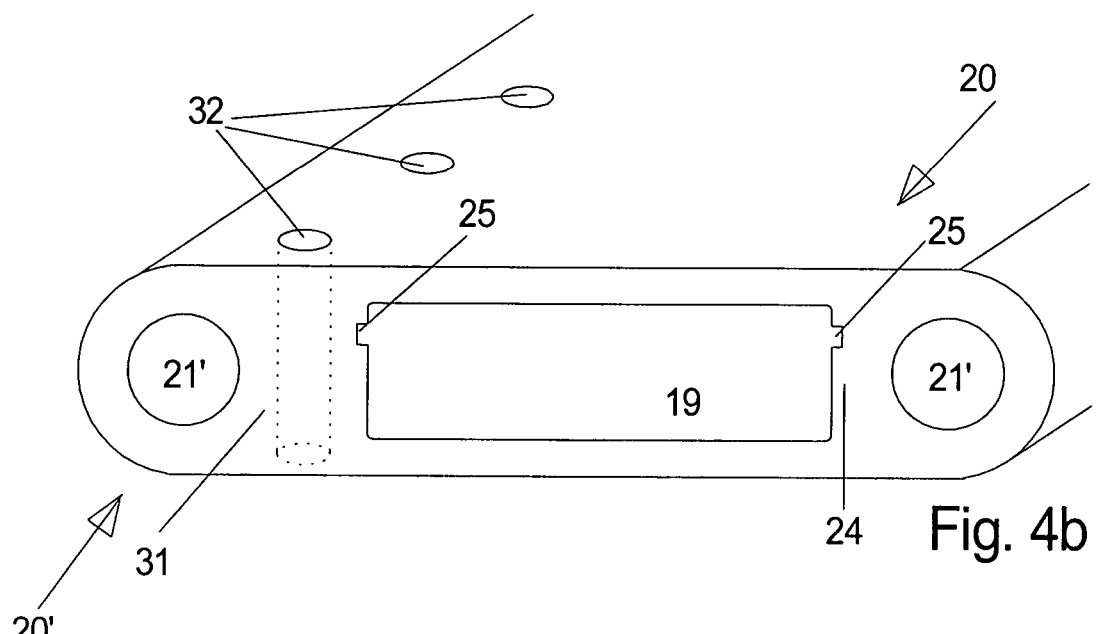
FIG. 4: section representations of the protective profile.

BRIEF DESCRIPTION OF THE PREFERRED EMBODIMENTS:

FIGS. 1 and 2 show a sensitive element whereupon the support body 1 is a tube having a circular transverse section and which, as like the wave-guide 3 centrally extending inside it, is represented much shortened. In practice, these two constructive elements are conceived very long compared to the diameter since there is necessary that in the measuring direction 10 they should extend over the entire measuring area.

Instead of a wave guide extending in a straight line inside the support body there can be employed a curved support body, in particular annularly and circularly curved, together with the wave guide 3 arranged inside it, thereby the measuring direction 10 could be no more a straight line but a curved one, for example a circle or an almost entire circle.

The wave guide 3 is centrally supported inside the considerable greater interior hollow of the support body 1 by longitudinally spaced ribs or by having it propped against the interior diameter of the support body 1, propping usually effected for example by means of one or more cannular pieces with a homogenous or cellular structure, for example by means of a cellular hose 26. Between the exterior circumference of this hose 26 and the interior circumference of the tube there is arranged an insulated inverse current conductor 27.

At the front end, the left one in FIGS. 1 and 2, the support body can be tightly closed by a front lid 7 while the wave guide 3 can have at its free front end a damper 13 to avoid thus reflecting the mechanical vibrations arising there in the wave guide 3 and damp them as much as possible.

But for the invention there is important the rear end of both the cannular support body 1 and the wave guide 3 and their joining to the terminal plate or circuit board 2 there arranged, without the necessity to insert this terminal plate in any type of support or housing, considering that but this housing or the support can be stable joined to the support body 1. The terminal plate will be directly stable joined without the intermediary housing to the protective profile 20 by force or form joining.

To this end, at the rear end of the support body 1 there is machined a recess 11 over a length corresponding at the maximum to the length of the terminal plate 2. Here, referring to the transverse section of the support body 1, either —as represented in FIGS. 1, 2*a* and 3—there is taken a parallel to a tangent, interiorly shifted, and the greater portion thus separated of the transverse section is removed. On the smaller remaining portion of the transverse section, then further remaining in the shape of an extension 9, there is glued the terminal plate 2.

Since the terminal plate 2—seen in the measuring direction 10, therefore in the extending direction of the support body 1 and of the wave guide 3—is considerably wider than the transverse section of the support body 1, this arrangement of the terminal platinum plate 2 is effected thus that it should protrude but on side over the width of the transverse section of the support body 1, therefore in particular it should end on the other side with the exterior rim of the support body, in particular with the exterior rim of the extension 9, as best seen in FIG. 3.

Here, the glue 14 is preferably arranged not only between the contact surfaces of the terminal plate 2 with the extension 9, but between the terminal plate 2 and the interior circumference segment of this extension 9 too, in order to provide a safe gluing, and reaches preferably around the rims of the extension 9 too, slightly over the exterior surface of the extension.

Figure 5B:
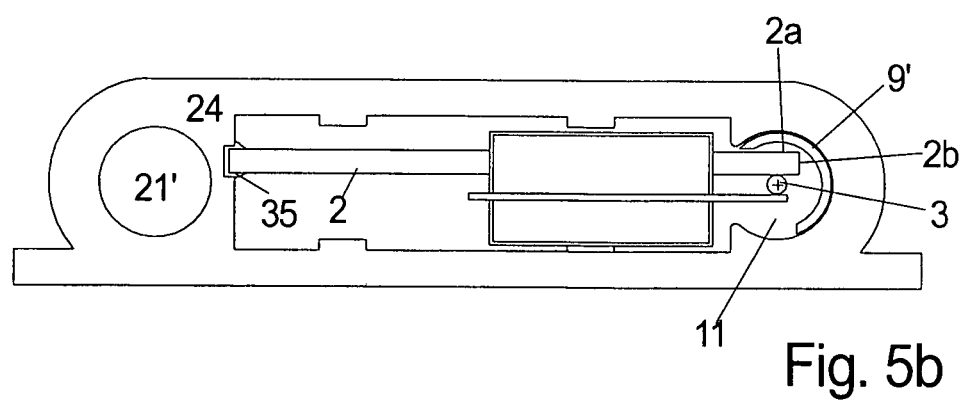
FIG. 5*b*: another embodiment of the displacement sensor in a front view.

Another recess type is shown in an upper view in FIG. 2*b*, and as seen in the measuring direction is likewise shown in FIG. 5*b* too:

As best shown in FIG. 5*b*, referring to the transverse section, the recess 11 extends but over about 90°-160°, thus that the extension 9 should have an approximately C shaped transverse section the terminal plate 2 should enter with its edge. The extension 9 comprises one of the main faces of the terminal plate 2 as well as the narrow face 2*b* which enters the interior circumference of the extension 9. The extension 9 reaches here around that main face of the terminal plate 2 but enough to allow the wave guide there joined to the terminal plate 2 still remain accessible for joining to the terminal plate 2, and if necessary to the Villary tape 4 too.

Supplementary, on the solution according to FIG. 2*b*, the terminal platintim plate 2 is likewise conceived longer in the measuring direction 10 than in case of the other presented solutions. The enlarged surface of the terminal plate 2 is used to include there the entire processing electronics thus that from this sensitive element there can be obtained an industrially employed output signal.

But the recess 11 having this extension 9 of the cannular support body 1 will not be enlarged, usually representing but a fraction from the length of the terminal plate 2. In order to stable attach the rest of the length segment to the support body 1, preferably the wall of the cannular support body 1 will be cut off according to the thickness of the terminal plate 2 while this will enter the slot, preferably through the slot inside the cannular support body 1, with which is thus possible a gluing over the entire length of the slot 34.

As shown in FIGS. 1, 3 and 2*a*, the terminal plate 2 is equipped with different components, whereupon the equipping is preferably effected but on an exterior surface, namely the exterior surface opposed in respect of the extension 9. A component, the detection coil 5, is here seated into a penetration of the terminal platinum plate 2 and is thus extending on both sides of the plate, whereupon the greater portion of the transverse section protrudes on the equipped side of the platinum plate 2.

This is done to the end that the plate 2 together with the components it is equipped with—in a lateral view, therefore seen in the plane of the terminal plate 2—should protrude as little as possible over the width of the support body 1. The element having the greatest width is here the detection coil 5, which is thicker than the support body 1. Here, the thickness of the extension 9 seen in this view is chosen making allowance for the thickness of the terminal plate 2 and the inserting depth of the detection coil 5 into the terminal plate 2, thus that the detection coil 5 either should protrude but on one side—upwards in FIG. 1—over the width of the support body, while in the other direction should end with the exterior rim of the support body 1, or should protrude over the width of the support body 1 approximately as much as in the other directions.

The detection coil 5 has an approximately cylindrical shape with a central cylindrical orifice, opened at least unilaterally, preferably on both sides. The positioning of the detection coil 5 must be here supplementary thus chosen that a so called Villary tape 4 should extend approximately centrally longitudinally through this orifice 5*a* of the detection coil 5 and should protrude in the direction to the wave guide 3, and to be attached to it, in particular to be glued or welded, namely on the side of the wave guide 3 opposite in respect of the terminal plate 2. Hence is obvious that the detection coil 5 is arranged with its longitudinal central axis transversely to the direction of the wave-guide 3 but parallel to the plane of the terminal plate 2.

Further, on the terminal plate 2 there is arranged a terminal pole 6, therefore a coupling element between the terminal end of the wave guide 3 and the electrically conductive patterns of the terminal plate 2.

A connector 8 arranged on the terminal plate 2, preferably in the farthest area in respect of the support body 1, provides the electrical connection of the terminal plate 2 to an exterior processing unit.

The terminal plate 2 has a penetration 12 to attach the detection coil 5, whose size is thus calculated that the detection coil 5 to be inserted here cannot fall through it but should enter the terminal plate to the desired theoretical depth.

Preferably here the penetration 12 is not rectangular as the corresponding longitudinal section of the detection coil 5 but has at its corners indentation shaped widenings thus that to avoid forming cracks in the plate because of the sharp rim corners and to allow the detection coil 5 being pressed inside between the flanks between the notches with a relatively great force since these areas are employed as elastic attachment lugs. In particular the detection coil 5 can be attached in between but by compression.

FIG. 3 shows in detail, in an enlarged longitudinal section through the symmetry axis of the detection coil 5, how on the one hand the coil extends on both sides of the terminal plate 2 and how the Villary tape 4, freely console overhanging from the attaching point on the wave guide 3, is extending, without coming into contact with the detection coil 5, through its orifice 5*a*, protruding on the opposite side. FIG. 3 shows too the attachment of the wave guide 3 by means of the terminal pole 6, a component part of the terminal plate 2, on this terminal plate, and thereby the coupling of the wave guide 3 to the other components on the plate 2 and to the inverse current conductor 27 arranged between the extension 9 and the rear non- equipped side of the plate 2.

FIG. 3 likewise shows that on one side, the left one in FIG. 3, the detection coil does not protrude over the width of the support body 1, unlike the situation in the right side, the equipped side of the terminal plate 2, because of the greater diameter of this detection coil in respect of the support body 1.

FIG. 4*a* further shows a protective profile 20 in two versions, as a rule realized as a profile extruded for example from aluminum or as a profile extruded from a suitable plastic material. Inside such a protective profile there can be inserted the sensitive element as shown in FIG. 5*a*.

Usually, the protective profile 20 is symmetrically conceived in respect of its longitudinal median plane 23 which is extending in the profile direction and sits perpendicularly on the greater spread of the transverse section.

In FIG. 4*a*, the two halves of the profile are represented in different versions:

Their common feature is the very flattened transverse section in the shape of an elongated rectangle with rounded narrow sides of the protective profile 20. Here, of the two longer parallel longitudinal walls, one can be extended on both sides over the ends from the narrower sides and form here extensions 15 to be used for screwing, gripping or other types of attachment to a constructive element, for example for inserting into a slot too.

Especially when there are no extensions 15, as shown in FIG. 4*a* in the right half of the drawing or in FIG. 4*b*, *c*, such a flattened protective profile provides the possibility to positioning the position magnet 28 in any angular position on one of the three areas of the circumference of the protective profile narrow side, close to the wave guide 3 there inserted, which makes possible a very flexible application of the sensor in the respective employing situation.

The exterior surfaces 18*a*, *b* are—not considering if necessary these prominent extensions and the passings towards the remaining contour—smooth, to prevent other objects being hooked.

The interior opening 19 can be a continuous opening, as shown in the right half of the drawing, with an interior circumference 21 in the shape of an incompletely closed circle at the end from the narrower side of this opening. This interior circumference 21 is thus dimensioned that inside it can be inserted the support body 1 of a sensitive element 22, as shown in FIG. 5.

The loop, representing the connection of the interior circumference 21 to the remaining opening 19, is wide enough and thus arranged that the terminal plate 2, unilaterally going away from the transverse section of the support body 1, together with the components with which it is equipped enters it and thus can enter the central opening 19, and if necessary is supported by shape with its free end into the corresponding groove 25, in particular eccentric, from the opposite end of the opening 19, as best seen in the left half of FIG. 5b. Here, the terminal plate 2 enters this groove 25 not only joined by shape, but is likewise dampedly attached to it, for example by gluing by means of a mechanical vibrations damping glue 35.

In the left side of the drawing from FIG. 4a there is represented an embodiment where the analog interior circumference 21' is a closed interior circumference, therefore this hollow is separated with the opening 19 by a rib. In the rib 24, on its exterior side, therefore towards the opening 19, there can be machined a groove 25 in order to support the free end of a terminal plate 2 of a sensitive element 22 whose support body 1 is in the opposite interior circumference 21.

Since the terminal plate 2 is attached to the support body and is extending not centrally but shifted in respect of the centre, this groove 25 can be likewise eccentrically machined in the rib 24.

Figure 4C:
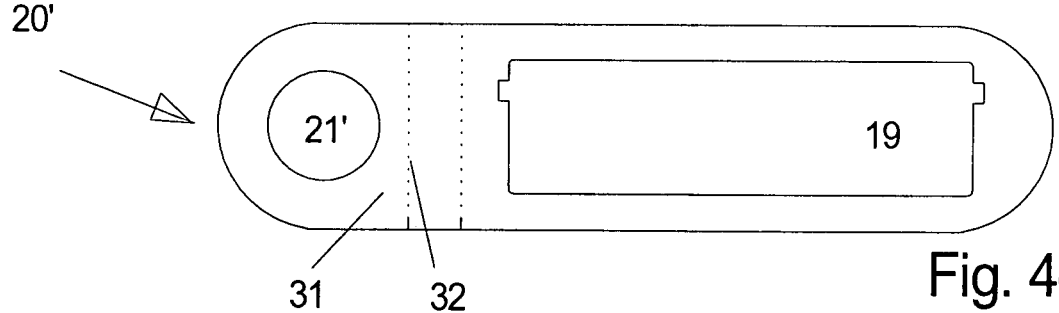

Further, FIGS. 4b and 4c show another embodiments of the protective profile:

A common feature of both solutions from FIGS. 4b and 4c is that in transverse section these have a smooth exterior contour without rims, without the extensions 15 according to FIG. 4a. However, in order to attach this protective profile 21' to the contiguous constructive elements, in the interior the interior circumference 21' is separated with the opening 19 by a widened rib to form a stiffening wall 31 whose thickness is great enough to bore in it spaced passing orifices 32 from one of the exterior surfaces towards the opposed exterior surface of the protective profile 20', as shown in FIG. 4b, without the necessity that these passing orifices 32 should have in the interior a connection towards the interior circumference 21' or towards the opening 19.

While in FIG. 4b in both terminal areas of the protective profile 20' there is an interior circumference 21', the embodiment according to FIG. 4c has but one interior circumference 21' and beside it an opening 19. In both cases one of the ribs 24 between the opening 19 and the interior circumference 21' is formed as a widened stiffing wall 31 equipped with passing orifices, thereby the protective profile 20' according to FIG. 4b having likewise an asymmetrical shape.

Furthermore, out of the above mentioned reasons, the grooves 25 from the opening 19 are likewise eccentrically arranged in respect of the transverse median of the opening 19.

If the protective profile 20 is symmetrically conceived, with a closed interior circumference 21' as shown in the left half of the drawing, such an insertion can obviously be effected but by having the rib 24 previously removed from the terminal area of the front side of the protective profile 20 over a length necessary to insert the terminal plate 2.

This removal is usually mechanically effected, for example by milling, and must be likewise effected over such an axial length that supplementary in respect of inserting the plate, in the open front end of the protective profile should be inserted a terminal lid 16 too, which seats with the closing plate 16a in the exterior on the front surface of the protective profile 20 while the plugging element 16b enters the opening of the protective profile 20 and is tight in respect of the interior circumference of the protective profile 20, preferably by means of a conventional O-ring joint 36.

Figure 6A:
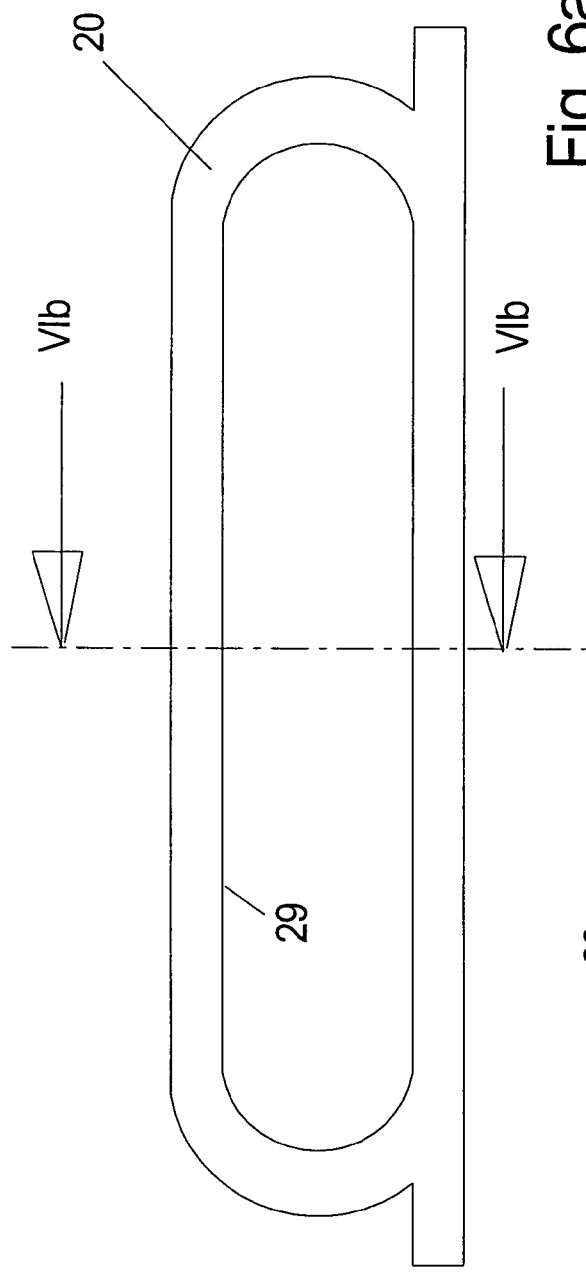
FIG. 6: a longitudinal section through the terminal area of the sensor.
Figure 6B:
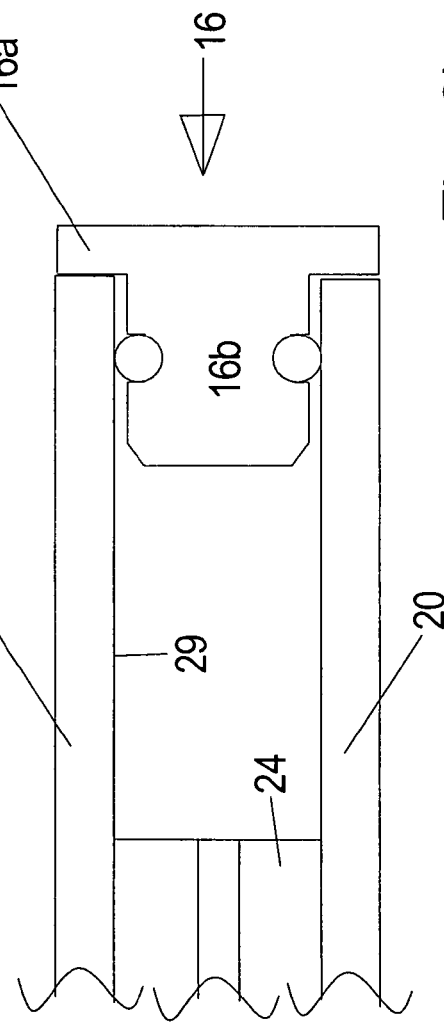

To this end, the plugging element 16b must have a smooth exterior circumference while the protective profile 20, in its longitudinal area, a suitable smooth interior circumference. To this end, as shown in FIG. 6, the interior contour of the protective profile 20 is milled at least over the longitudinal area of the plugging element 16b to obtain thus a rectangularly shaped smooth contour 29 with its narrow parts rounded off in the shape of a hemicycle without shoulders, in that the rib 24 and the prominent corners between the opening 19 and the interior circumference 21 are likewise milled, as well as the ribs 17 prominent from the longitudinal sides towards the interior, employed to stiffen the profile and seat the terminal plate 2.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

The invention claimed is:

1. Magnetostrictive displacement sensor having a sensitive element, said displacement sensor comprising:
    a support body extending in a measuring direction;
    a wave guide extending in an interior of said support body;
    a protective profile to include said sensitive element, the protective profile having at least an interior circumference in which the support body of the sensitive element can be inserted into by shape joining, wherein a terminal plate attached to the support body supports at least a detector and a joining between a rear end of the wave guide and an electrically conductive patterns of the terminal plate is arranged in an interior opening of the protective profile.

2. A displacement sensor according to claim 1 wherein said interior circumference is a closed interior circumference while said interior opening is separated with said interior circumference by a rib or by a stiffening wall respectively.

3. A displacement sensor according to claim 1 wherein said protective profile has a shape as flattened as possible with exterior surfaces parallel each other while in a transverse section the ratio between length and width is at least 2 to 1.

4. A displacement sensor according to claim 1 wherein said interior opening has at least one interiorly orientated rib for propping said terminal plate.

5. A displacement sensor according claim 1 wherein said protective profile is a cut off segment of an extruded profile and if necessary is interiorly milled in a terminal area to include at least one terminal lid of said protective profile.

6. A displacement sensor claim 5 wherein said at least one terminal lid has a continuous exterior circumference, and as a tightening element in respect of said interior circumference of said protective profile there is employed an O-ring joint inserted into a groove running all around the exterior circumference.

7. A displacement sensor according to claim 5 wherein said terminal lids have a continuous exterior circumference and are clamped or pressed on said protective profile.

8. A displacement sensor according to claim 1 wherein said protective profile has in a stiffening wall spaced passing orifices in the measuring direction, that is, the longitudinal direction, which in a transverse section plane of said protective profile is extending in a spreading direction of the stiffening wall, as they are not connected to said interior opening and said interior circumference of said protective profile.

9. A displacement sensor according to claim 1 wherein between an exterior circumference of said support body and said interior circumference of said protective profile there is arranged at least one supporting element spaced in the measuring direction.

10. A displacement sensor according to claim 9 wherein said at least one supporting element is an O-ring joint.

11. A displacement sensor according to claim 9 wherein said at least one supporting element is a supporting hose made of plastic material.

12. A displacement sensor according to claim 9 wherein said at least one supporting element is made of fabric.

13. A displacement sensor according to claim 9 wherein said at least one supporting element is made of glued singular surfaces.

14. A displacement sensor according to claim 1 wherein said interior opening has a groove at least on a narrow side opposed in respect of said at least one interior circumference for inserting a longitudinal rim, opposed in respect of said at least one interior circumference of said terminal plate joined to said support body.

15. A displacement sensor according to claim 1 wherein said protective profile having an exterior surface with at least one wide area has at least one extension protruding over the remaining protective profile.

16. A displacement sensor according to claim 15 wherein said protective profile is symmetrically formed in respect of a longitudinal median plane of said exterior surface.

17. A displacement sensor according to claim 1 wherein said protective profile has two interior circumferences each other in a mutual opposed relationship to include said support body of said sensitive elements.

18. A displacement sensor according to claim 1 wherein said protective profile has a shape as flattened as possible with exterior surfaces parallel each other while in a transverse section the ratio between length and width is at least at least 3 to 1.

19. A displacement sensor according to claim 1 wherein said protective profile has a shape as flattened as possible with exterior surfaces parallel each other while in a transverse section the ratio between length and width is at least 5 to 1.

20. A displacement sensor according claim 1 wherein said protective profile is a cut off segment of an extruded profile and is interiorly milled in the terminal area to include at least one terminal lid of the protective profile.

21. A displacement sensor according claim 1 wherein said protective profile is a cut off segment of an extruded profile and is interiorly milled in a terminal area to include the terminal plate of the element and at least one terminal lid of said protective profile.

22. A magnetostrictive sensitive element, said element comprising:
a support body extending in a measuring direction and having a front and a rear end;
a wave guide extending in an interior of said support body; and
a terminal plate attached to the support body which supports at least one detector, a terminal pole and an electric connection unit wherein the rear end of the support body is unilaterally recessed in a lateral view, while to a remanent extension there is attached the terminal plate in the recess.

23. An element according to claim 22 wherein as to its terminal section, said recess extends over less than 180° while said extension surrounds an inferior side as well as a narrow side of said terminal plate.

24. An element according to claim 22 wherein said wave guide supports a transversely spaced Villary tape extending in parallel to said terminal plate.

25. An element according to claim 22 wherein said electric connection unit is a connector.

26. An element according to claim 22 wherein cutting rims forming said remnant extension extend in parallel to said measuring direction and thereby in the longitudinal direction of said support body.

27. An element according to claim 22 wherein said terminal plate is tightly joined to said remnant extension.

28. An element according to claim 22 wherein said terminal plate is arranged in parallel to said measuring direction.

29. An element according to claim 22 wherein said terminal plate is arranged vertically to said measuring direction.

30. An element according to claim 22 wherein said terminal plate extends along said support body farther than the end of said recess in the opposed end direction of said support body.

31. An element according to claim 30 wherein in said support body, from the end of said recess, there is arranged a slot corresponding in thickness to said terminal plate, extending in said measuring direction said terminal plate enters and is there attached.

32. An element according to claim 22 wherein said detection coil surrounding said wave-guide or a Villary tape is arranged into a penetration of said terminal plate and extends on both sides of the plane of said terminal plate.

33. An element according to claim 22 wherein said terminal plate is at the exterior circumference of said support body with one of its longitudinal rims extending in said measuring direction.

34. An element according to claim 22 wherein said detector is arranged into a penetration of said terminal plate thus that it either should not protrude over the transverse width selection of said support body or it should not be on either of those two sides more to the interior in respect of the exterior circumference of said support body.

35. An element according to claim 22 wherein at least said front end of said support body, opposed in respect of said terminal plate, is opened.

36. An element according to claim 22 wherein said terminal plate is equipped with components on the opposite side in respect of said remnant extension, excepting penetration of said terminal plate for said detector and the contacts for gluing the components.

37. An element according to claim 22 wherein Villary tape extends in parallel to the plane of said terminal plate.

38. An element according to claim 22 wherein glue fills the entire space between said remnant extension and said terminal plate.

39. An element according to claim 22 wherein said detector is arranged with its longitudinal central axis in parallel to the plane of said terminal plate.

40. An element according to claim 22 wherein as to its terminal section, said recess extends over less than 130° while said extension surrounds an inferior side as well as a narrow side of said terminal plate.

41. An element according to claim 22 wherein both ends of said support body are open.

42. An element according to claim 22 wherein glue covers at least partially the exterior rims of said extension at its rear side.

43. A method for mounting a magnetostrictive sensitive element, said method comprising the following steps:
positioning a wave guide having an end into an interior of a support body extending in a measuring direction;
attaching Villary tape at the end of the wave guide prominent in recess;
inserting a detection coil having an orifice into the Villary tape from its free end; and
attaching a terminal plate to an extension.

44. A method according to claim 43 wherein on insertion the detection coil is already tightly attached to or into the terminal plate respectively.

45. A method according to claim 43 wherein upon inserting the detection coil on the Villary tape, the terminal plate is already equipped inclusively with a terminal pole and afterwards, the terminal pole existing on the terminal plate, after insertion being under the wave guide, is joined to the wave guide.

46. A method according to claim 45 wherein the terminal pole is joined by tinning to the wave guide.

47. A method according to claim 43 wherein the wave guide is positioned inside the tube in the firstly there is inserted into the tube and let free an elastic cellular hose, in a longitudinal direction when stretched, for splicing in the interior circumference of the tube and further the wave-guide is inserted or pulled into a central hollow of the cellular hose.

48. A method according to claim 47 wherein a diameter of the cellular hose is thus dimensioned that after positioning inside the tube there should remain a central hollow greater than the transverse section of the wave guide.

49. A method according to claim 47 wherein the wave guide is inserted or pulled by means of an auxiliary core into a central hollow of the cellular hose.

50. A method according to claim 43 wherein an opposed end in respect of the terminal plate, the cellular hose is pressed upon the wave guide as damper.

51. A method according to claim 43 wherein in the tube or in the support body respectively, together with the cellular hose there is pulled the inverse current conductor between the hose and the support body.

* * * * *